United States Patent
Adachi et al.

(10) Patent No.: US 10,964,208 B2
(45) Date of Patent: Mar. 30, 2021

(54) DRIVING ASSISTANCE DEVICE

(71) Applicant: Mitsubishi Electric Corporation, Chiyoda-ku (JP)

(72) Inventors: Yoshiaki Adachi, Chiyoda-ku (JP); Yuji Hamada, Chiyoda-ku (JP); Takashi Maeda, Chiyoda-ku (JP); Katsuya Kawai, Chiyoda-ku (JP); Masahiko Ikawa, Chiyoda-ku (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 177 days.

(21) Appl. No.: 16/096,565

(22) PCT Filed: Mar. 7, 2017

(86) PCT No.: PCT/JP2017/008903
§ 371 (c)(1),
(2) Date: Oct. 25, 2018

(87) PCT Pub. No.: WO2018/008192
PCT Pub. Date: Jan. 11, 2018

(65) Prior Publication Data
US 2019/0139406 A1 May 9, 2019

(30) Foreign Application Priority Data
Jul. 6, 2016 (JP) .............................. JP2016-133894

(51) Int. Cl.
*G08G 1/09* (2006.01)
*B60W 50/14* (2020.01)
(Continued)

(52) U.S. Cl.
CPC ............. *G08G 1/093* (2013.01); *B60W 50/14* (2013.01); *G08G 1/09* (2013.01);
(Continued)

(58) Field of Classification Search
CPC ..................................................... G08G 1/093
See application file for complete search history.

(56) References Cited

U.S. PATENT DOCUMENTS 8,265,861 B2 * 9/2012 Ikeda ................. G08G 1/09675
701/117
8,649,964 B2 * 2/2014 Kizaki ................... G08G 1/093
701/300
(Continued)

FOREIGN PATENT DOCUMENTS

JP 2008-217314 A 9/2008
JP 2009-192317 A 8/2009
(Continued)

OTHER PUBLICATIONS

International Search Report dated May 30, 2017 in PCT/JP2017/008903 filed Mar. 7, 2017.

*Primary Examiner* — Michael A Berns
(74) *Attorney, Agent, or Firm* — Xsensus LLP

(57) ABSTRACT

A plurality of items of environmental information, which are used for distribution control of plural items of vehicle information that are received using wireless communication by an external communication device from a plurality of surrounding vehicles, are made into an environmental information list by an environmental information setting mechanism and managed. Based on the environmental information list, for the plural items of vehicle information received by the external equipment communication device, selection is performed using a dynamic filtering part of a dynamic distribution controller and distribution control is performed using the priority level according to a dynamic priority controller. A driving assistance device that receives this information assists a driver in driving, and environmental information set in the environmental information list is generated.

16 Claims, 9 Drawing Sheets

(51) Int. Cl.
  *G08G 1/0967* (2006.01)
  *B60W 30/165* (2020.01)
  *G08G 1/16* (2006.01)

(52) U.S. Cl.
  CPC ..... *G08G 1/096783* (2013.01); *B60W 30/165* (2013.01); *G08G 1/09675* (2013.01); *G08G 1/163* (2013.01)

(56) References Cited

U.S. PATENT DOCUMENTS

| | | | |
|---|---|---|---|
| 8,838,323 B2* | 9/2014 | Matsunaga | B60W 30/10 701/28 |
| 9,679,488 B2* | 6/2017 | Matsumoto | B60W 10/184 |
| 2008/0215232 A1 | 9/2008 | Ikeda et al. | |
| 2012/0083998 A1 | 4/2012 | Kizaki | |
| 2019/0139406 A1* | 5/2019 | Adachi | G08G 1/093 |
| 2020/0265715 A1* | 8/2020 | Maeda | G08G 1/096741 |

FOREIGN PATENT DOCUMENTS

| | | |
|---|---|---|
| JP | 2012-79032 A | 4/2012 |
| JP | 2012-164327 A | 8/2012 |
| JP | 2012-203867 A | 10/2012 |
| JP | 2014-59651 A | 4/2014 |

* cited by examiner

FIG. 3

| No | APPLICATION NAME | FILTERING METHOD | FILTERING PARAMETER | PERIOD OF VALIDITY | EFFECT LEVEL |
|---|---|---|---|---|---|
| 1 | APPLICATION A | WHITELIST | ID={1} | 10 SECONDS | 1 |
| 2 | APPLICATION B | DISTANCE | WITHIN 200m | 30 SECONDS | 130 |
| 3 | APPLICATION C | BLACKLIST | ID={3,4} | 5 SECONDS | 202 |
| ... | ... | ... | ... | ... | ... |

FIG. 4

| No | APPLICATION NAME | PRIORITY CONTROL METHOD | PRIORITY CONTROL PARAMETER | PERIOD OF VALIDITY | EFFECT LEVEL |
|---|---|---|---|---|---|
| 1 | APPLICATION A | DISTANCE | ID={1} | 10 SECONDS | 1 |
| 2 | APPLICATION B | RISK | ID={2} | 20 SECONDS | 101 |
| 3 | APPLICATION C | FIXING | ID={5} PR=1 | CONSTANT | 201 |
| ... | ... | ... | ... | ... | ... |

FIG. 6A

| FILTERING METHOD | EFFECT LEVEL |
|---|---|
| WHITELIST | 0 |
| DISTANCE | 100 |
| BLACKLIST | 200 |

FIG. 6B

| FILTERING PARAMETER | EFFECT LEVEL |
|---|---|
| ID | ID QUANTITY |
| DISTANCE | DISTANCE /10 |

FIG. 6C

| No | APPLICATION NAME | FILTERING METHOD | FILTERING PARAMETER | PERIOD OF VALIDITY | EFFECT LEVEL |
|---|---|---|---|---|---|
| 1 | APPLICATION A | WHITELIST | ID={1} | 10 SECONDS | 1 |
| 2 | APPLICATION B | DISTANCE | WITHIN 300m | 30 SECONDS | 130 |
| 4 | APPLICATION D | DISTANCE | WITHIN 400m | 60 SECONDS | 140 |
| 3 | APPLICATION C | BLACKLIST | ID={3,4} | 5 SECONDS | 203 |
| ... | ... | ... | ... | ... | ... |

FIG. 8A

| LATITUDE (deg) | LONGITUDE (deg) | SPEED (m/s) | ORIENTATION (deg) | ... |
|---|---|---|---|---|
| 35.000 | 135.000 | 16.6 | 0 | ... |

FIG. 8B

| ID | LATITUDE (deg) | LONGITUDE (deg) | SPEED (m/s) | ORIENTATION (deg) | ... |
|---|---|---|---|---|---|
| 1 | 34.999 | 135.000 | 11.4 | 0 | ... |
| 2 | 35.002 | 135.000 | 16.6 | 180 | ... |
| 3 | 35.005 | 135.000 | 11.4 | 0 | ... |

FIG. 8C

| ID | LATITUDE (deg) | LONGITUDE (deg) | SPEED (m/s) | ORIENTATION (deg) | ... |
|---|---|---|---|---|---|
| 2 | 35.002 | 135.000 | 16.6 | 180 | ... |
| 1 | 34.999 | 135.000 | 11.4 | 0 | ... | ns to a driving assistance
DRIVING ASSISTANCE DEVICE

TECHNICAL FIELD

The present invention relates to a driving assistance device that exchanges vehicle information such as position, speed, acceleration, and orientation with a peripheral vehicle using wireless communication, and assists a driver with driving.

BACKGROUND ART

A driving assistance system is a system that recognizes an environment in a periphery of a vehicle and determines a situation using a vehicle-mounted sensor and wireless communication equipment mounted in the vehicle, thereby providing a driver with various kinds of driving assistance with an object of improving safety and comfort.

Driving assistance carries out a provision of information and an issue of an alert to a driver, or various kinds of control of a vehicle, thereby aiding driving by the driver, and has applications such as, for example, autonomous emergency braking, adaptive cruise control, and lane keeping assistance.

Among these, driving assistance using wireless communication exchanges vehicle information such as position, speed, acceleration, and orientation with a vehicle in a periphery of a host vehicle, and determines a situation from a positional relationship with the peripheral vehicle and a cruising state of the host vehicle, thereby assisting a driver with driving. Because of this, driving assistance using wireless communication can recognize a vehicle at an intersection at which detection with a vehicle-mounted sensor is difficult, or recognize a vehicle two or more vehicles ahead, because of which driving assistance can be provided by determining a situation over a wider area than that using a vehicle-mounted sensor.

However, a driving assistance system wherein a multiple of driving assistance applications using wireless communication operate is such that vehicle information is received simultaneously from a multiple of peripheral vehicles, because of which there is a problem in that when attempting to process all of the vehicle information in the order received, a processing delay occurs, and driving assistance cannot be provided at an appropriate timing.

Therefore, in order to distribute important vehicle information with priority, distribution control such that proximity of vehicles is predicted from positional relationships and correlations in vehicle information of a multiple of peripheral vehicles received by wireless communication, and a high priority level is allotted to vehicle information of a vehicle predicted to approach closely in the future, whereby vehicle information with a high priority level is distributed with priority, is described in, for example, JP-A-2012-79032 (Patent Document 1).

Also, in order to dynamically change a priority level allotted in accordance with a cruising state, providing a region of focus for which a priority level is set in a geographical space, and changing the region of focus in accordance with a cruising state, is described in, for example, JP-A-2012-164327 (Patent Document 2). Also, distribution control such that, when a peripheral vehicle exists in a region of focus, vehicle information with a high priority level is distributed with priority by a priority level of the region of focus being allotted is described.

CITATION LIST

Patent Literature

Patent Document 1: JP-A-2012-79032 (Pages 6 to 9, FIG. 1)
Patent Document 2: JP-A-2012-164327 (Pages: 8 to 11, FIG. 1)

SUMMARY OF INVENTION

Technical Problem

However, the distribution control described in Patent Document 1 is such that although distribution control is implemented using a priority level based on a prediction of positional relationship, a priority level calculation method is uniquely fixed, because of which distribution control in accordance with requirements cannot be carried out when a multiple of driving assistance applications desire separate vehicle information. Because of this, there is a problem, in that the distribution control cannot be utilized in a situation in which a multiple of driving assistance applications operate.

Also, the distribution control described in Patent Document 2 is such that although a priority level is dynamically changed by a region of focus being changed, in accordance with a cruising state, there is no means that sets the region of focus from an exterior of a distribution control unit, because of which a priority level calculation method cannot be changed, even when vehicle information to be distributed changes owing to an addition, change, or deletion of a driving assistance application to be operated. Because of this, there is a problem in that the distribution control cannot be utilized in a situation in which a driving assistance application dynamically changes.

The invention, having been contrived in order to resolve the heretofore described kinds of problem, has an object of providing a driving assistance device such that vehicle information in accordance with a dynamic change in a driving assistance application, or a dynamic change in each vehicle, is distributed in situation in which one or more driving assistance applications operate, whereby driving assistance is carried out at an appropriate timing.

Solution to Problem

A driving assistance device according to the invention is a driving assistance device that provides driving assistance to a driver based on vehicle information from a peripheral vehicle, and includes communication means that receives vehicle information by wireless communication from a multiple of the peripheral vehicle, environmental information management means that manages multiple items of environmental information used for controlling distribution of multiple items of the vehicle information received by the communication means, distribution control means that carries out distribution control for the driving assistance of the multiple items of the vehicle information received by the communication means, based on the environmental information managed by the environmental information management means, and multiple driving assistance means that provides driving assistance to the driver based on the vehicle information distributed by the distribution control means, and carries out a setting of the environmental information managed by the environmental information management means, wherein the environmental information manager manages the environmental information set by the multiple of the driving assistance processor, and the environmental information includes an effect level for avoiding setting interference caused by multiple items of the environmental information.

Advantageous Effects of Invention

According to the invention, a driving assistance device that provides driving assistance to a driver based on vehicle information from a peripheral vehicle includes communication means that receives vehicle information by wireless communication from a multiple of the peripheral vehicle, environmental information management means that manages multiple items of environmental information used for controlling distribution of multiple items of the vehicle information received by the communication means, distribution control means that carries out distribution control for the driving assistance of the multiple items of the vehicle information received by the communication means, based on the environmental information managed by the environmental information management means, and driving assistance means that provides driving assistance to the driver based on the vehicle information distributed by the distribution control means, and carries out a setting of the environmental information managed by the environmental information management means, because of which distribution of multiple items of vehicle information is controlled based on environmental information set by the driving assistance means, whereby vehicle information necessary for driving assistance can be reliably distributed.

Objects, characteristics, aspects, and advantages of the invention other than those heretofore described will become more apparent from the following detailed description of the invention, which refers to the drawings.

BRIEF DESCRIPTION OF DRAWINGS

FIG. 3 is a diagram showing an example of a filtering-related environmental information list of the driving assistance device according to the first embodiment of the invention.

FIG. 4 is a diagram showing an example of a priority control-related environmental information list of the driving assistance device according to the first embodiment of the invention.

FIGS. 6A to 6C are diagrams showing an example of adding environmental information to an environmental information list of the driving assistance device according to the first embodiment of the invention.

FIGS. 8A to 8C are diagrams for describing an example of distribution control using environmental information in the dynamic distribution control means of the driving assistance device according to the first embodiment of the invention.

DESCRIPTION OF EMBODIMENTS

First Embodiment

Hereafter, using the drawings, a first embodiment of the invention will be described. A driving assistance device according to the first embodiment is assumed to be mainly vehicle-mounted equipment, and a case in which service is provided as a driving assistance device of a driving assistance system will be described.

Figure 1:
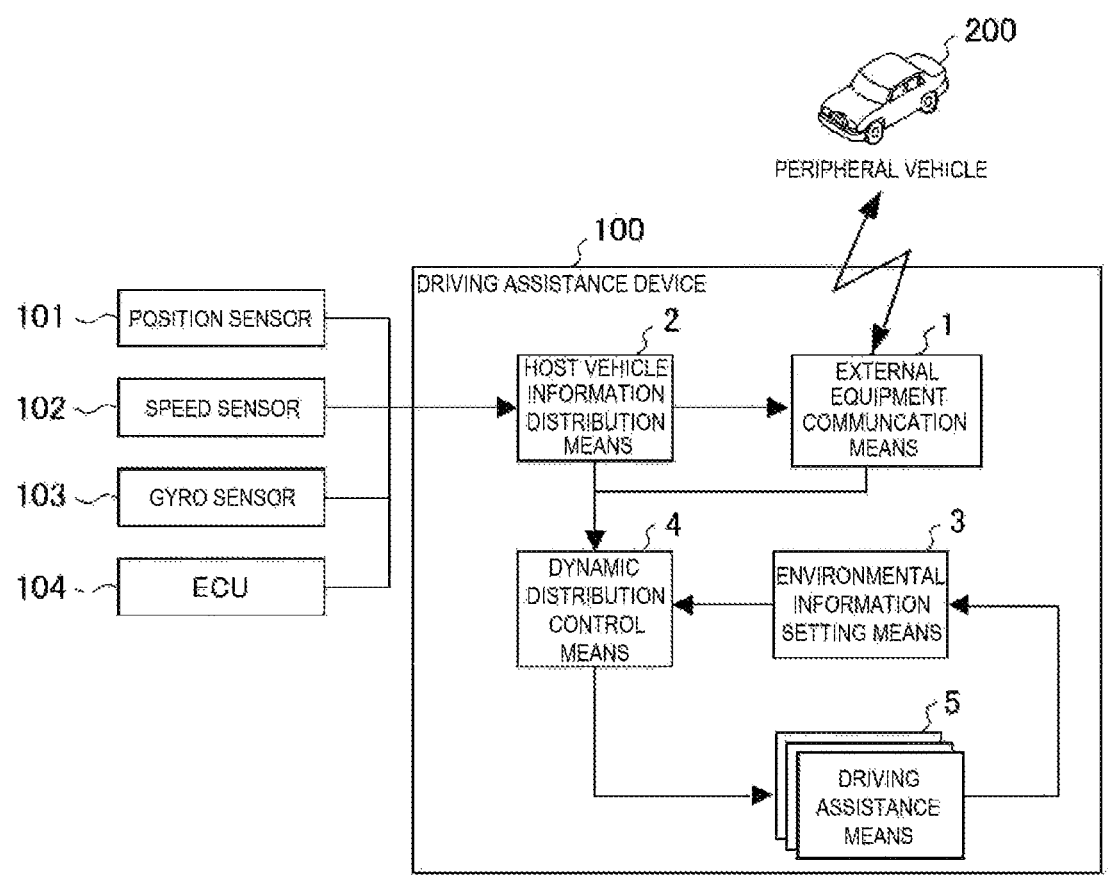
FIG. 1 is a block diagram showing a configuration of a driving assistance device according to a first embodiment of the invention.

FIG. 1 is a block diagram showing a configuration of the driving assistance device according to the first embodiment.

In FIG. 1, a driving assistance system is a system that provides driving assistance to a driver by a driving assistance device 100 exchanging vehicle information with a peripheral vehicle 200 using wireless communication, and is configured of the driving assistance device 100, a position sensor 101, a vehicle speed sensor 102, a gyro sensor 103, an ECU (electronic control unit) 104, and the peripheral vehicle 200.

In the following description, the position sensor 101, the vehicle speed sensor 102, the gyro sensor 103, and the ECU 104 are collectively called "vehicle-mounted sensors" or "vehicle-mounted equipment".

Herein, vehicle information is information representing a vehicle state and a cruising state, and is configured of, for example, an identifier for uniquely identifying a vehicle, a position, a speeds an acceleration, an orientation, a steering angle, a yaw rate, a braking state, a direction indicator state, a weight, a vehicle length, and the like.

In the following description, vehicle information from the peripheral vehicle 200 acquired by wireless communication is called "other vehicle information", and vehicle information of a host vehicle acquired from the vehicle-mounted sensors or the vehicle-mounted equipment is called "host vehicle information", in the driving assistance device 100.

Also, in the following description, the peripheral vehicle 200 may be called an "other vehicle", and a vehicle in which the driving assistance device 100 mounted and whose driver is assisted in driving may be called a "host vehicle".

Also, wireless communication, DSRC (dedicated short range communication) may be used, a communication method utilized in a wireless LAN (local area network) or a mobile telephone may be used, or a communication method utilized in IEEE802.11p, which is being considered in Europe and the USA, or CALM (communication access for land mobile), or the like, may be used.

The vehicle-mounted sensors or the vehicle-mounted equipment is connected to the driving assistance device directly or via a vehicle-mounted network. The position sensor 101 is a device that can identify a position of, for example, a GPS receiver or the like. The vehicle speed sensor 102 is a device that can acquire a speed of the host vehicle from an amount of change in, for example, a vehicle speed pulse or a position. The gyro sensor 103 is a device that can acquire an acceleration and an orientation of the host vehicle.

In addition to the position sensor 101, the vehicle speed sensor 102, and the gyro sensor 103, a sensor that acquires information included in vehicle information may exist in the vehicle-mounted sensors.

Also, a CAN (control area network), which is common in vehicle-mounted communication, may be used for a vehicle-mounted network, or FlexRay, which is capable of high-speed communication, Ethernet (registered trademark), or the like may be used.

Also, the peripheral vehicle 200 generates vehicle information from vehicle-mounted sensors that are mounted, and transmits the vehicle information using wireless communication. The host vehicle receives the vehicle information directly from the peripheral vehicle 200, or indirectly using a repeater such as roadside equipment. The peripheral vehicle 200 is such that a multiple of vehicles may exist in a periphery of the host vehicle.

The driving assistance device 100 is a vehicle-mounted communication information processing device that carries out driving assistance for the driver of the host vehicle, using other vehicle information generated by the peripheral vehicle 200 and received by wireless communication.

As shown in FIG. 1, the driving assistance device 100 has external equipment communication means 1 (communication means), host vehicle information distribution means 2, environmental information setting means 3 (environmental information management means), dynamic distribution control means 4 (distribution control means), and driving assistance means 5.

The external equipment communication means 1 is a processing unit that receives other vehicle information generated by the peripheral vehicle 200 by wireless communication, and provides the received other vehicle information to the dynamic distribution control means 4. The external equipment communication means 1 may also implement a process of transmitting host vehicle information generated by the host vehicle information distribution means 2 to the peripheral vehicle 200.

The host vehicle information distribution means 2 is a processing unit that acquires information configuring vehicle information from the vehicle-mounted sensors or the vehicle-mounted equipment, generates host vehicle information, and provides the host vehicle information to the external equipment communication means 1, the dynamic distribution control means 4, and the driving assistance means 5.

The information acquired by the host vehicle information distribution means 2 from the vehicle-mounted sensors or the vehicle-mounted equipment may be a direct output value of the vehicle-mounted sensors, or may be a value processed by some process being carried out.

The environmental information setting means 3 is a processing unit that manages environmental information set by a multiple of the driving assistance means 5, and provides environmental information when the dynamic distribution control means 4 carries out distribution control of other vehicle information. A configuration thereof will be described hereafter using FIG. 2.

The dynamic distribution control means 4 is a processing unit that carries out distribution control of other vehicle information, based on environmental information provided by the environmental information setting means 3. A configuration thereof will be described hereafter using FIG. 2.

The driving assistance means 5 is a processing unit that determines a need or otherwise for driving assistance, and details of the driving assistance, using other vehicle information provided by the dynamic distribution control means 4, and provides driving assistance when driving assistance is necessary.

Driving assistance refers to aiding driving of the host car by the driver by providing information generated from other vehicle information to the driver or a vehicle-mounted control device of the host vehicle, and is, for example, prevention of a collision due to a sudden braking of a vehicle ahead, prevention of a collision with a vehicle existing in a blind spot when changing lane, prevention of a collision with an oncoming vehicle or a crossing vehicle when turning left or right or proceeding straight ahead at an intersection, a reduction in fuel consumption by running parallel with another vehicle, and the like.

Providing information to the driver is carried out by equipment notifying the driver connected to the driving assistance device 100, and is implemented by, for example, light, sound, vibration, or the like. The notification equipment may be, for example, a satellite navigation system, a HUD (head-up display), an instrument panel, a mobile telephone, a speaker, a steering wheel, or the like.

Also, the driving assistance means 5 generates environmental information, and sets the environmental information in the environmental information setting means 3. The set environmental information is information, for the driving assistance means 5 to control distribution of necessary or unnecessary vehicle information. Environmental information set by one driving assistance means 5 may be one item ox a multiple of items.

The driving assistance means 5 may also carry out driving assistance using host vehicle information provided by the host vehicle information, distribution means 2. Also, either one or a multiple of the driving assistance means 5 may exist.

One or more of the driving assistance means 5, also referred to as the driving assistance processor, are realized by one or more driving assistance applications stored in a memory being individually executed by a CPU (central processing unit).

Also, the host vehicle information distribution means 2, the environmental information setting means 3, also called an environmental information manager, which includes an environmental information receiver, an environmental information updater, and an environmental information provider, and the dynamic distribution control means 4 also referred to as a distribution controller, are realized by a program stored in a memory being executed by the CPU.

Figure 2:
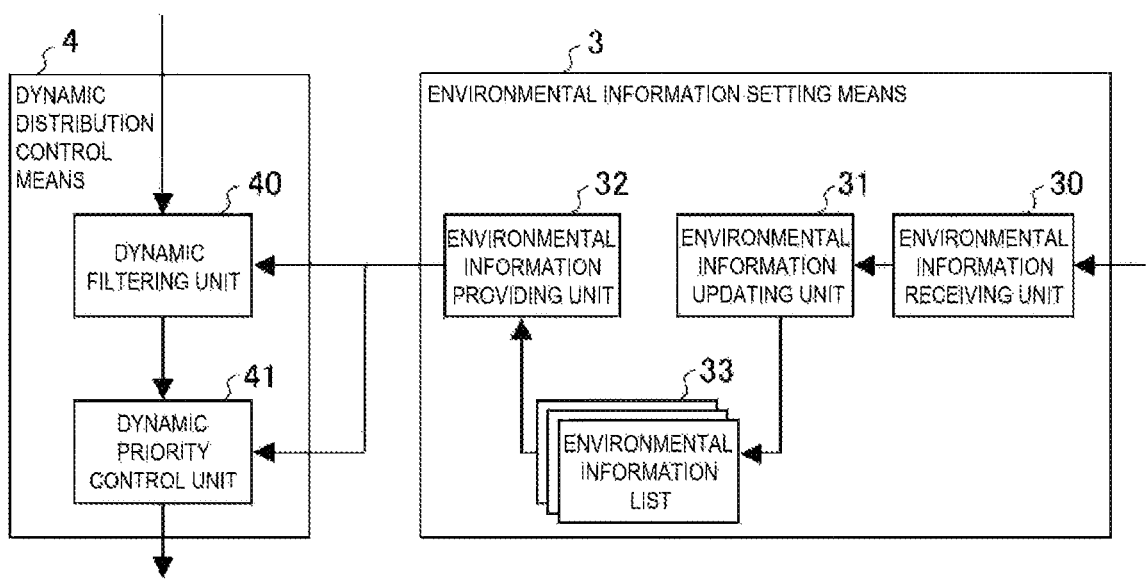
FIG. 2 is a block diagram showing configurations of environmental information setting means and dynamic distribution control means of the driving assistance device according to the first embodiment of the invention.

FIG. 2 is a block diagram showing the configurations of the environmental information setting means and the dynamic distribution control means of the driving assistance device according to the first embodiment.

In FIG. 2, reference signs 3 and 4 are the same articles as in FIG. 1.

The environmental information setting means 3 is a processing unit that manages environmental information set by a multiple of the driving assistance means 5, and provides environmental information when the dynamic distribution control means 4 carries out distribution control of other vehicle information.

The environmental information setting means 3 has an environmental information receiving unit 30, an environmental information updating unit 31, an environmental information providing unit 32, and an environmental information list 33.

The environmental information receiving unit 30 is a processing unit that receives environmental information generated by the driving assistance means 5, and provides the received environmental information to the environmental information updating unit 31. The environmental information receiving unit 30 may convert the environmental information generated by the driving assistance means 5 into an internal format registered in the environmental information updating unit 31.

The environmental information updating unit 31 is a processing unit that calculates an effect level of environmental information provided by the environmental information receiving unit 30, adds to the environmental information list 33, changes environmental information registered in the environmental information list 33, and deletes environmental information registered in the environmental information list 33.

With regard to adding to the environmental information list 33, the environmental information updating unit 31 calculates an effect level, and adds to the environmental information list 33 in order of increasing calculated effect level, in order to avoid setting interference caused by multiple items of environmental information. An effect level is a value calculated based on information relating to distribution control included in environmental information, wherein, for example, environmental information that can be applied to a large number of items of other vehicle information has a higher effect level than environmental information that can be applied to only a small number of items of other vehicle information.

Also, in order to prevent necessary other vehicle information from being sorted out, environmental information specifying necessary other vehicle information is registered with priority over environmental information specifying unnecessary other vehicle information. For example, when there is "environmental information A" that specifies other vehicle information of a "vehicle 1" as being necessary and "environmental information B" that specifies other vehicle information of the "vehicle 1" as being unnecessary, the "environmental information A" is added in a higher position in the environmental information list 33. This registration method may be included in effect level calculation.

The environmental information providing unit 32 is a processing unit that provides the environmental information list 33 to the dynamic distribution control means 4. The environmental information list 33 may be provided by the environmental information providing unit 32 distributing the environmental information list 33, or by the dynamic distribution control means 4 acquiring the environmental information list 33 by requesting the environmental information providing unit 32.

The environmental information list 33 is managed by the environmental information updating unit 31, and is an ordered list holding multiple items of environmental information. The environmental information list 33 holds the multiple items of environmental information in an order applied in the dynamic distribution control means 4. A multiple of the environmental information list 33 may exist in accordance with control details of the dynamic distribution control means 4.

Herein, environmental information is information generated by the driving assistance means 5, and used for the dynamic distribution control means 4 to control distribution of other vehicle information to the driving assistance means 5. Environmental information is configured of distribution control information and distribution control parameter information.

Distribution control information is information specifying a method relating to control of other vehicle information distribution by the dynamic distribution control means 4. A method relating to distribution control refers to a method of processing other vehicle information and controlling distribution, and there are, for example, a filtering method for selecting other vehicle information, a priority control method for distributing important, other vehicle information with priority, and the like.

Specifically, a distribution control method to be applied is selected from a multiple of distribution control methods of the dynamic distribution control means 4. Environmental information may be configured of multiple items of distribution control information.

Distribution control parameter information is information specifying a setting value for implementing a distribution control method specified by distribution control information for control of other vehicle information distribution by the dynamic distribution control means 4. The setting value indicates a value necessary for a distribution control method, and is, for example, an identifier that can uniquely identify an other vehicle to which the distribution control method is applied, a relativity value that specifies an other vehicle to which the distribution control method is applied as a correlation, a vehicle information priority level, or the like. The distribution control parameter may be omitted when there is no particular parameter to be specified.

The dynamic distribution control means 4 is a processing unit that carries out other vehicle information distribution control based on environmental information provided by the environmental information setting means 3.

The dynamic distribution control means 4 has a dynamic filtering unit 40 (filtering unit) and a dynamic priority control unit 41 (priority control unit). The dynamic distribution control means 4 may acquire host vehicle information necessary for dynamic distribution control from the host vehicle information distribution means 2.

The dynamic filtering unit 40 is a processing unit that, based on environmental information relating to filtering held by the environmental information setting means 3, selects a filtering method to be applied to each item of other vehicle information from a multiple of filtering methods, determines the necessity or otherwise of the other vehicle information, and classifies the other vehicle information.

Herein, filtering refers to determining the necessity or otherwise of other vehicle information, and allowing through or eliminating, the other vehicle information. As filtering methods, there are, for example, a geographical method whereby other vehicle information is classified from a geographical relationship based on geographical information, a whitelist method whereby other vehicle information is classified using a list that enumerates necessary other vehicle information, a blacklist method whereby other vehicle information is classified using a list that enumerates unnecessary other vehicle information, a communication frequency method whereby other vehicle information is classified from a frequency of wireless communication, a distance method whereby other vehicle information is classified from a relative distance between a host vehicle and an other vehicle, and the like.

The dynamic filtering unit 40 has one or more filtering methods that can be selected in accordance with environmental information. Also, two or more filtering methods may be used in combination when filtering one item of other vehicle information.

The dynamic priority control unit 41 is a processing unit that acquires environmental information relating to priority control held lay the environmental information setting means 3, selects a calculation method to be applied to each item of other vehicle information from a multiple of priority level calculation methods, calculates the priority level of the other vehicle information, and distributes the other vehicle information sequentially.

A priority level calculation method is means of calculating an index for allotting a distribution order to multiple items of other vehicle information, and there are, for example, a fixing method whereby a fixed priority level is assigned, an arrival order calculation method whereby a priority level is calculated in order of arrival, a distance calculation method whereby a priority level is calculated from relative distance, a speed calculation method whereby a priority level is calculated, from relative speed, a time calculation method whereby a priority level is calculated f rom a time until a collision, a voting calculation method whereby a priority level is calculated by voting from an application, a risk calculation method whereby a priority level is calculated, from a collision risk, and the like. The dynamic priority control unit 41 has one or more priority level calculation methods. The dynamic distribution control means 4 may include both the dynamic filtering unit 40 and the dynamic priority control unit 41, or may be configured of only one thereof.

FIG. 3 is a diagram showing an example of a filtering-related environmental information list of the driving assistance device according to the first embodiment.

FIG. 3 shows filtering-related environmental information set by the driving assistance means 5. Filtering-related environmental information has a "filtering method" as distribution control information and a "filtering parameter" as distribution control parameter information, and also has a "number", which is an identifier for identifying environmental information, an "application name", which is a name of the driving assistance means that sets the environmental information, a "period of validity" indicating a period for which the environmental information is valid, and an "effect level" calculated by the environmental information updating unit 31.

Also, FIG. 3 shows an order in which environmental information is to be applied as an ordered list, and the dynamic filtering unit 40 applies the environmental information in order from the top of the environmental information list.

FIG. 4 is a diagram showing an example of a priority control-related environmental information list of the driving assistance device according to the first embodiment.

FIG. 4 shows priority control-related environmental information set by the driving assistance means 5. Priority control-related environmental information has a "priority control method" as distribution control information and a "priority control parameter" as distribution control parameter information, and also has a "number", which is an identifier for identifying environmental information, an "application name", which is a name of the driving assistance means that sets the environmental information, a "period of validity" indicating a period for which the environmental information is valid, and an "effect level" calculated by the environmental information updating unit 31.

Also, FIG. 4 shows an order in which environmental information is to be applied as an ordered list, and the dynamic priority control unit 41 applies the environmental information in order from the top of the environmental information list.

Herein, an example of environmental information and the environmental information list 33 of the environmental information setting means 3 of the driving assistance device 100 according to the first embodiment will be described using FIG. 3 and FIG. 4.

Herein, as an example, it is assumed that the dynamic distribution control means 4 has the dynamic filtering unit 40 and the dynamic priority control unit 41, and it is assumed that the environmental information list 33 has a filtering-related environmental information list and a priority control-related environmental information list.

In the example of FIG. 3, the dynamic filtering unit 40 is assumed to have the whitelist method, whereby other vehicle information to be allowed through is specified, the blacklist method, whereby other vehicle information to be eliminate is specified, and the distance method, whereby other vehicle information to be allowed through is specified, as filtering methods.

In the example of FIG. 4, the dynamic priority control unit 41 is assumed to have the risk calculation method, whereby a priority level is calculated from a direction of travel of an other vehicle, the distance calculation method, whereby a priority level is calculated from a relative distance, and the fixing method, whereby a fixed priority level is allotted to a specific vehicle, as priority control methods.

In the example of FIG. 3, the order in which environmental information is to be applied is shown as an ordered list, and the dynamic filtering unit 40 applies the environmental information in order from the top of the environmental information list.

For example, environmental information set by an "application A" indicates that other vehicle information with a vehicle identifier "1" is classified using the "whitelist method", as shown in FIG. 3, and when the dynamic filtering unit 40 acquires other vehicle information with the vehicle identifier "1" from the external equipment communication means 1, the dynamic filtering unit 40 allows the other vehicle information through.

Also, environmental information set by an "application B" indicates that other vehicle information wherein the relative distance from the host vehicle is "within 300 m" is classified, using the "distance method", and the dynamic filtering unit 40 allows through other vehicle information wherein the relative distance from the host vehicle is within "300 m".

Meanwhile, environmental information set by an "application C" indicates that other vehicle information with a vehicle identifier "3" or "4" is filtered using the "blacklist method", and the dynamic filtering unit 40 eliminates other vehicle information with the vehicle identifier "3" or "4".

On acquiring other vehicle information, the dynamic filtering unit 40 applies filtering in the order of environmental information number "1", number "2", and number "3".

In the example of FIG. 4, the order in which environmental information is to be applied is shown as an ordered list, and the dynamic priority control unit 41 applies the environmental information in order from the top of the environmental information list.

For example, environmental information set by the "application A" indicates that vehicle information with the vehicle identifier "1" is such that a priority level is calculated using the "distance calculation method", as shown in FIG. 4, and when the dynamic priority control unit 41 acquires other vehicle information with the vehicle identifier "1", the dynamic priority control unit 41 calculates the priority level of the other vehicle information from the distance from the host vehicle.

Also, environmental information set by the "application B" indicates that other vehicle information with a vehicle identifier "2" is such that a priority level is calculated using the "risk calculation method", and when the dynamic priority control unit 41 acquires other vehicle information with the vehicle identifier "2", the dynamic priority control unit 41 calculates the priority level of the other vehicle information from the risk of a collision with the host vehicle.

Furthermore, environmental information set by the "application C" indicates that other vehicle information with a vehicle identifier "5" is such that a priority level is calculated using the "fixing method", and the dynamic priority control unit 41 sets a fixed priority level of "1" for other vehicle information with the vehicle identifier "5".

On acquiring other vehicle information, the dynamic priority control unit 41 calculates a priority level in the order of environmental information number "1", number "2", and number "3".

FIGS. 6A to 6C are diagrams showing an example of adding environmental information to the environmental information list of the driving assistance device according to the first embodiment.

FIG. 6A is a table showing the effect level of each filtering method.

FIG. 6B is a table showing the effect level of each filtering parameter.

FIG. 6C shows a result of adding number "4", which is new environmental information, to the filtering-related environmental information list shown in FIG. 3. The effect level of number "4" is 140, which is 40 of FIG. 6B added to 100 of FIG. 6A.

Herein, the filtering methods are assumed to be the whitelist method, the blacklist method, and the distance method, in the same way as in the example of FIG. 3.

FIGS. 8A to 8C are diagrams illustrating an example of distribution control using environmental information in the dynamic distribution control means of the driving assistance device according to the first embodiment.

FIGS. 8A to 8C show an example of inputting host vehicle information and inputting other vehicle information into the dynamic distribution control means 4, and outputting other vehicle information.

FIG. 8A is host vehicle information acquired by the dynamic distribution control means 4 from the host vehicle information distribution means 2.

FIG. 8B is a list of other vehicle information simultaneously acquired by the dynamic distribution control means 4 from the external equipment communication means 1.

FIG. 8C is the list of other vehicle information showing an order in which the other vehicle information is processed and distributed by the dynamic distribution control means 4.

Figure 9A:
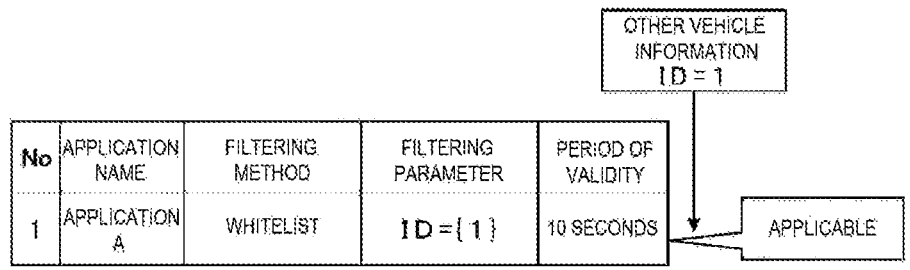
FIGS. 9A to 9C are diagrams for describing an example of filtering using environmental information in the dynamic distribution control means of the driving assistance device according to the first embodiment of the invention.
Figure 9B:
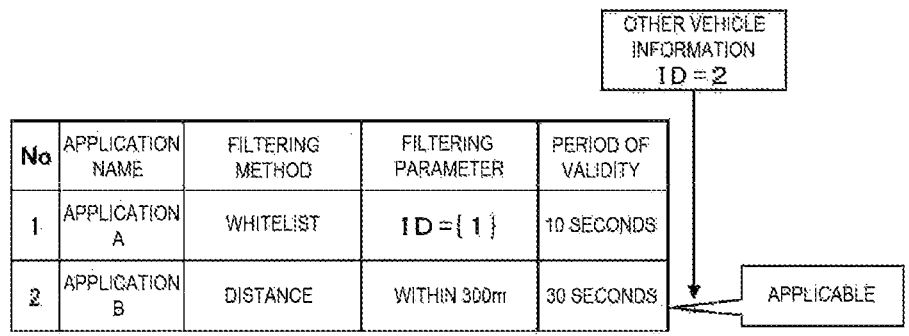
Figure 9C:
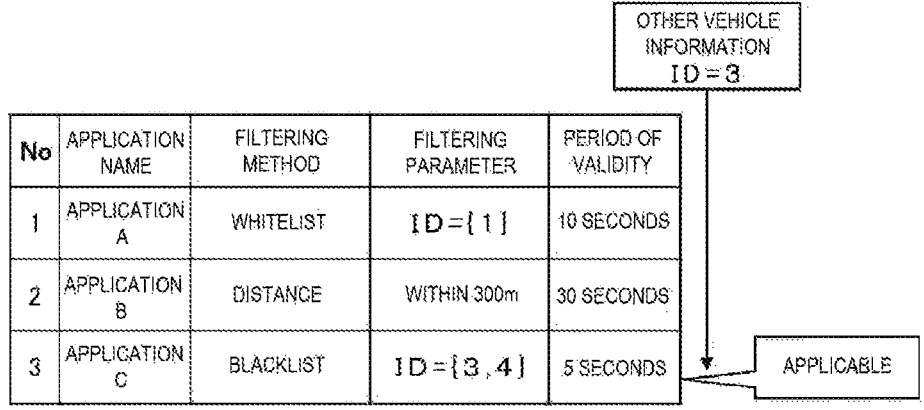

FIGS. 9A to 9C are diagrams for describing an example of filtering using environmental information in the dynamic distribution control means of the driving assistance device according to the first embodiment.

FIGS. 9A to 9C show an aspect of classifying other vehicle information using the same kind of environmental information list as in FIG. 3.

FIG. 9A is a diagram showing a process of the dynamic filtering unit 40 classifying "other vehicle information 1" based on environmental information.

FIG. 9B is a diagram showing a process of the dynamic filtering unit 40 classifying "other vehicle information 2" based on environmental information.

FIG. 9C is a diagram showing a process of the dynamic filtering unit 40 classifying "other vehicle information 3" based on environmental information.

Figure 10A:
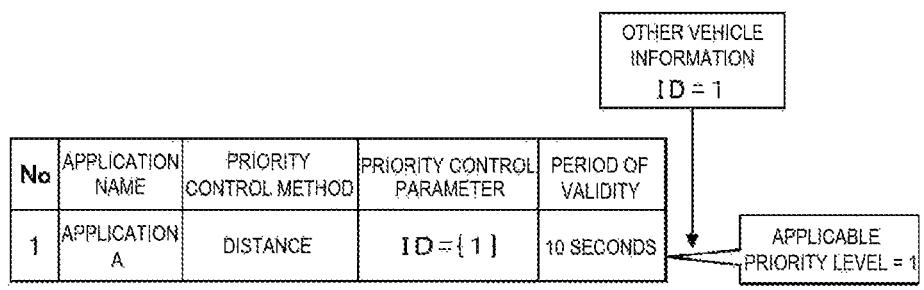
FIGS. 10A and 10B are diagrams for describing an example of priority control using environmental information in the dynamic distribution control means of the driving assistance device according to the first embodiment of the invention.
Figure 10B:
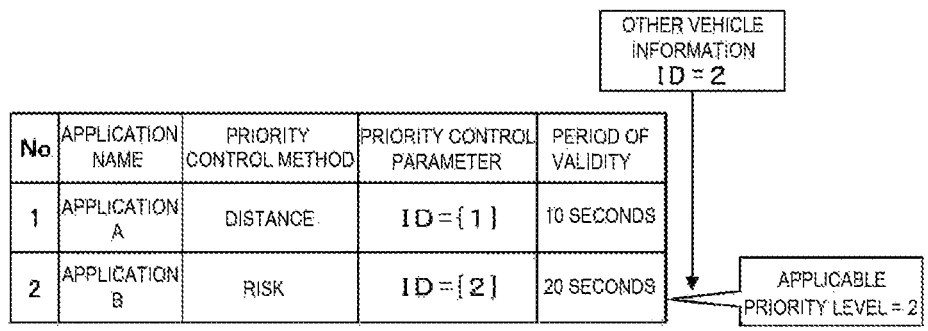

FIGS. 10A and 10B are diagrams for describing an example of priority control using environmental information in the dynamic distribution control means of the driving assistance device according to the first embodiment.

FIG. 10 FIGS. 10A and 10B show an aspect of calculating a priority level of other vehicle information using the same kind of environmental information list as in FIG. 4.

FIG. 10A is a diagram showing a process of the dynamic priority control unit 41 calculating the priority level of the "other vehicle information 1" based on environmental information.

FIG. 10B is a diagram showing a process of the dynamic priority control unit 41 calculating the priority level of the "other vehicle information 2" based on environmental information.

Next, an operation of each means of the driving assistance device according to the first embodiment will toe described.

Firstly, using FIG. 8, an operation of the environmental information setting means 3 will be described. Herein, as an example, it is assumed that provision of the environmental information list 33 by the environmental information providing unit 32 is carried out in accordance with an acquisition request from the dynamic distribution control means 4.

After the driving assistance device 100 starts up (step S300), the environmental in format ion receiving unit 30 waits to receive environmental information from the driving assistance means 5, the environmental information updating unit 31 waits until a time of period of validity processing regularly executed internally, and the environmental information providing unit 32 waits to receive an environmental information acquisition request from the dynamic distribution control means 4 (step S301).

The environmental information receiving unit 30 continues to wait to receive environmental information when no environmental information is received in step S301, and shifts to step S310 when environmental information is received.

The environmental information updating unit 31 continues to wait when the period of validity confirmation processing time is not reached in step S301, and shifts to step S320 when the processing time is reached.

The environmental information providing unit 32 continues to wait to receive an environmental information acquisition request when no environmental information acquisition request is received in step S301, and shifts to step S330 when an environmental information acquisition request is received.

In step S310, the environmental information receiving unit 30 provides the received environmental information to the environmental information updating unit 31, and subsequently shifts to step S311.

In step S311, the environmental information updating unit 31 selects an environmental information list to be updated from the multiple of environmental information lists 33 based on the acquired environmental information, and subsequently shifts to step S312. Specifically, the environmental information updating unit 31 selects a filtering-related environmental information list when the environmental information is filtering-related environmental information, and selects a priority control-related environmental information list, when the environmental information is priority control-related environmental information.

In step S312, the environmental information updating unit 31 calculates an effect level of the environmental information received from the environmental information receiving unit 30. After calculating the effect level, the environmental information updating unit 31 shifts to step S313.

In step S313, the environmental information updating unit 31 extracts oho item of environmental information in order from the top of the environmental information list, and subsequently shifts to step S314. When the environmental information extraction is completed, the environmental information updating unit 31 shifts to step S315.

In step S314, the environmental information updating unit 31 carries out a comparison of an effect level (d) of the environmental information extracted from the environmental information list and an effect level (e) of the environmental information acquired from the environmental information receiving unit 30, shifts to step S313 when the effect level (d) of the environmental information extracted from the environmental information list is not greater than the effect level (e), and shifts to S315 when the effect level (e) of the environmental information acquired from the environmental information receiving unit 30 is smaller than the effect level (d).

In step S315, the environmental information updating unit 31 inserts the environmental information acquired from the environmental information receiving unit 30 into a position in the environmental information list obtained in step S313. After the insertion, the environmental information updating unit 31 shifts to step S301.

FIGS. 6A to 6C are diagrams showing an example of the processes of step S312 to step S315.

For example, it is assumed that a number "4", an application name "application D", the filtering method "distance method", a filtering parameter "within 400 m", and a period of validity "60 seconds" are provided to the environmental information setting means 3 as new environmental information.

Firstly, the environmental information updating unit 31 calculates an effect level of the new environmental information. As the filtering method of the new environmental information is the "distance method", an effect level "100" is obtained from FIG. 6A, and as the filtering parameter is "within 400 m", an effect level "40" is obtained from FIG. 6B. These are added together, thereby obtaining an effect level "140" of the new environmental information.

Next, the environmental information updating unit 31 extracts the environmental information with the number "1" from the environmental information list. On comparing an effect level "1" of the environmental information with the number "1" and the effect level "140" of the new environmental information, the effect level of the number "1" is smaller, because of which the environmental information updating unit 31 shifts to comparing the next environmental information.

Continuing, the environmental information, updating unit 31 extracts the environmental information with the number from the environmental information list. On comparing an effect level "130" of the environmental information with the number "2" and the effect level "140" of the new environmental information, the effect level of the number "2" is smaller, because of which the environmental information updating unit 31 shifts to comparing the next environmental information.

In the same way, the environmental information updating unit 31 extracts the environmental information with the number "3" from the environmental information list. On comparing an effect level "203" of the environmental information with the number "3" and the effect level "140" of the new environmental information, the effect level of the new environmental information is smaller, because of which the environmental information updating unit 31 adds the new environmental information with the number before the environmental information with the number "3" in the environmental information list.

In the way heretofore described, FIG. 6C in which the environmental information with the number "4" is added to the environmental information list of FIG. 3 is obtained.

Although a method whereby effect levels are added together by referring to tables, based on distribution control information and distribution control parameter information of environmental information, is used for effect level calculation in order to simplify the description in the specific example of FIGS. 6A to 6C, more complicated effect level calculation may be used.

Also, although a specific example of filtering-related environmental information is shown in FIGS. 6A to 6C, processing of priority control-related environmental information may be carried out in the same way.

Figure 5:
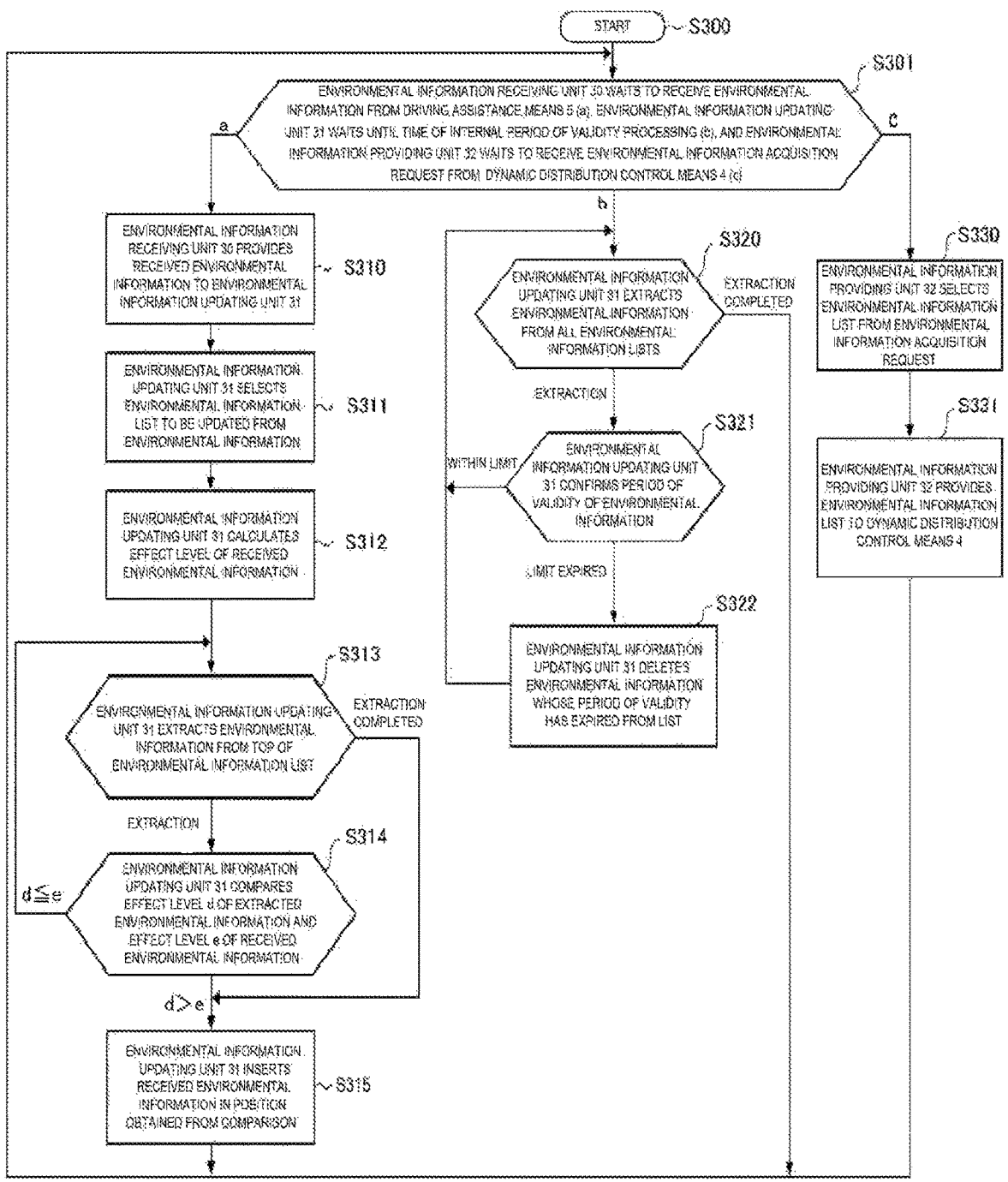
FIG. 5 illustrate a flowchart showing an operation of the environmental information setting means of the driving assistance device according to the first embodiment of the invention.

Returning to FIG. 5, in step S320, the environmental information updating unit 31 acquires all environmental information lists, and extracts environmental information in order from the environmental information lists. When environmental information has been extracted, the environmental information updating unit 31 shifts to step S321, and when extraction of all environmental information is completed, the environmental information updating unit 31 shifts to step S301.

In step S321, the environmental information updating unit 31 confirms a period of validity of the extracted environmental information, and subsequently shifts to step S322 when the period of validity has expired, and shifts to step S320 when the period of validity has not expired.

In step S322, the environmental information updating unit 31 eliminates environmental information whose period of validity has expired from the environmental information list, and subsequently shifts to step S320.

In step S330, the environmental information providing unit 32 receives an environmental information acquisition request from the dynamic filtering unit 40 or the dynamic priority control unit 41, selects an environmental information list in accordance with the request, and subsequently shifts to step S331.

In step S331, the environmental information providing unit 32 provides the environmental information list selected in step S330 to the request source, and subsequently shifts to step S301.

Next, using FIG. 7, an operation of the dynamic distribution control means 4 will be described. Herein, as an example, it is assumed that the dynamic distribution control means 4 is configured of the dynamic filtering unit 40 and the dynamic priority control unit 41. Also, it is assumed that host vehicle information used in distribution control by the dynamic distribution control means 4 is provided from the host vehicle information distribution means 2.

After the driving assistance device 100 starts up (step S400), the dynamic filtering unit 40 waits until receiving other vehicle information from the external equipment communication means 1 (step S401).

The dynamic filtering unit 40 continues to wait when no other vehicle information is received from the external equipment communication means 1 in step S401, and shifts to step S410 when other vehicle information is received.

In step S410, the dynamic filtering unit 40 acquires a filtering-related environmental information list from the environmental information providing unit 32, and subsequently shifts to step S411.

In step S411, the dynamic filtering unit 40 extracts one item of environmental information from the top of the environmental information list acquired in step S410. The dynamic filtering unit 40 shifts to step S413 when extraction of all the environmental information in the environmental information list is completed as a result of the extraction, and shifts to step S412 in any other case.

In step S412, the dynamic filtering unit 40 determines whether or not the environmental information extracted in step S411 can be applied to other vehicle information.

Specifically, the dynamic filtering unit 40 determines whether or not other vehicle information corresponds to a filtering parameter of the environmental information. When the environmental information can be applied, the dynamic filtering unit 40 determines the other vehicle information to be necessary in a case of environmental information that specifies other vehicle information that is to be allowed through, and determines the other vehicle information to be unnecessary in a case of environmental information that specifies other vehicle information that is to be eliminated.

When a result of the determination is that the environmental information can be applied, the dynamic filtering unit 40 shifts to step S414, and when the environmental information, cannot be applied, the dynamic filtering unit 40 shifts to step S411, and carries out a determination on the next environmental information.

In step S413, the dynamic filtering unit 40 determines the necessity or otherwise of other vehicle information by applying a preset default filtering method to the other vehicle information, and subsequently shifts to step S414.

In step S414, the dynamic filtering unit 40 receives a result of step S412 or step S413, and implements a classification of the other vehicle information. The dynamic filtering unit 40 shifts to step S415 when a result of the classification is that the other vehicle information is to be allowed through, and shifts to step S401 when the other vehicle information is to be eliminated.

In step S415, the dynamic filtering unit 40 provides the other vehicle information to the dynamic priority control unit 41, and subsequently shifts to step S420.

In step S420, the dynamic priority control unit 41 acquires apriority control-related environmental information list from the environmental information providing unit 32, and subsequently shifts to step S421.

In step S421, the dynamic priority control unit 41 extracts one item of environmental information from the top of the environmental information list acquired in step S420. The dynamic priority control unit 41 shifts to step S424 when extraction of all the environmental information in the environmental information list is completed as a result of the extraction, and shifts to step S422 in any other case.

In step S422, the dynamic priority control unit 41 determines whether or not the other vehicle information acquired in step S415 can be applied to the environmental information extracted in step S421. When a result of the determination is that the other vehicle information can be applied, the dynamic priority control unit 41 shifts to step S423, and when the other vehicle information cannot be applied, the dynamic priority control unit 41 shifts to step S421, and carries out a determination on the next environmental information.

In step S423, the dynamic priority control unit 41 calculates a priority level of the other vehicle information acquired in step S415, using a priority level calculation method described in the environmental information extracted in step S421. After calculating the priority level, the dynamic priority control unit 41 shifts to step S425.

Step S424 is a case wherein the other vehicle information cannot be applied to any of the environmental information, and in this case, the dynamic priority control unit 41 calculates the priority level of the other vehicle information acquired in step S415 using a default priority level calculation method. After calculating the priority level, the dynamic priority control unit 41 shifts to step S425.

In step S425, the dynamic priority control unit 41 implements a distribution of other vehicle information to the driving assistance means 5 based on the priority level calculated in step S423 or step S424.

Specifically, filtering is carried out from step S401 to step S424, and a distribution order of multiple items of other vehicle information whose priority levels have been calculated is determined from the priority levels. Determination of the distribution order is such that ordering is carried, out so that other vehicle information with a high priority level is distributed with priority. The dynamic priority control unit 41 distributes the other vehicle information to the driving assistance means 5 in accordance with this order.

Distribution control in step S425 is carried out asynchronously with respect to the processes of step S401 to step S424, because of which there is a shift to step S401 without waiting for an actual distribution at the stage at which the priority level and the other vehicle information are provided in step S425.

Figure 7:
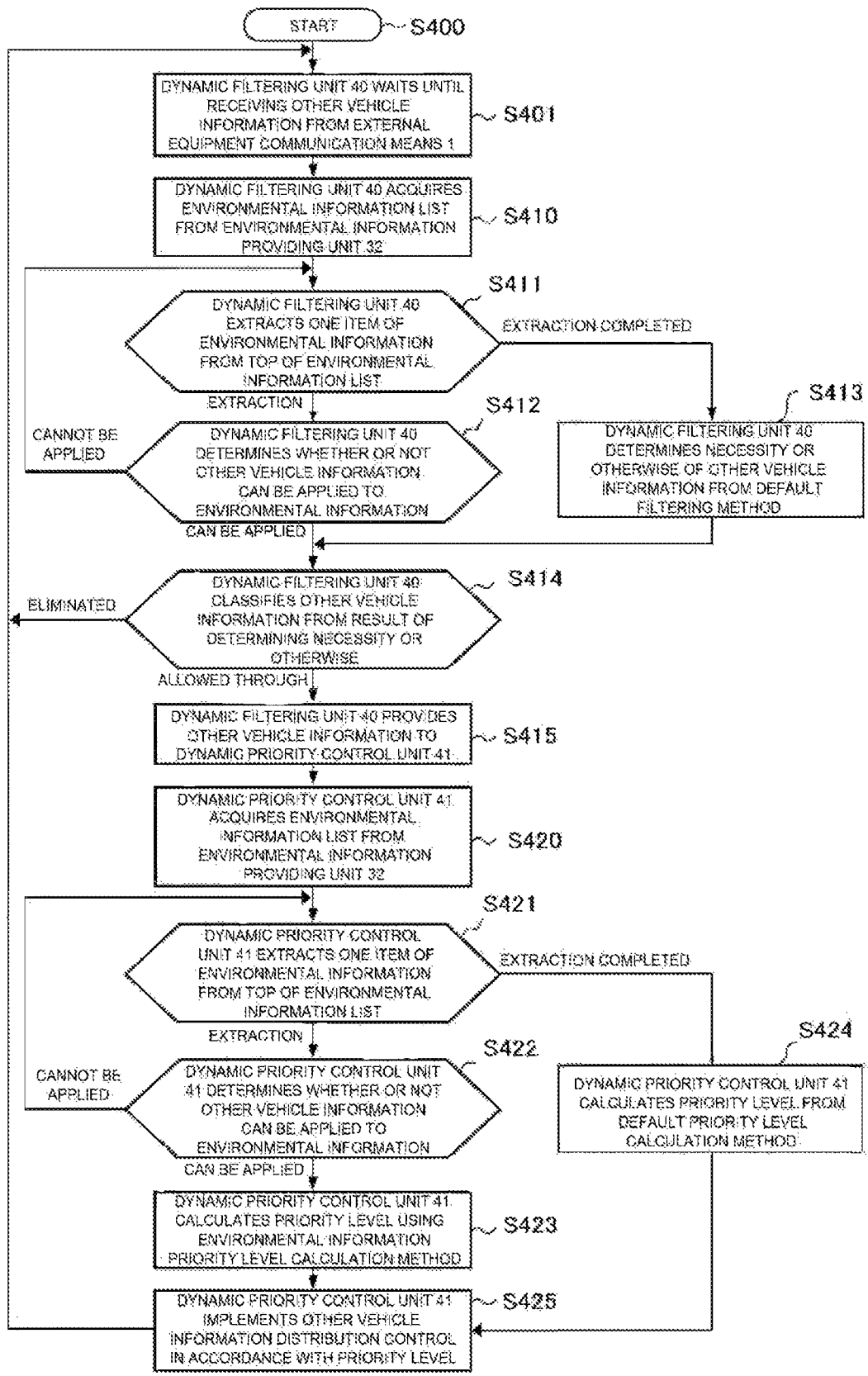
FIG. 7 illustrate a flowchart showing an operation of the environmental information setting means of the dynamic distribution control means of the driving assistance device according to the first embodiment of the invention.

In FIG. 7, as an example of priority control, environmental information that can be applied, is extracted in order from the top of the environmental information list, and priority level calculation is carried out using the priority level calculation method described in the extracted environmental information in step S420 to step S424, but determination of whether or not other vehicle information can be applied may be carried out for all the environmental information in the environmental information list, multiple items of environmental information to which the other vehicle information can be applied extracted, priority level calculation carried out using the priority level calculation method described in each item of environmental information, and the highest priority level among the multiple of priority levels set as the priority level of the other vehicle information.

Next, an operational example of distribution control by the dynamic distribution control means 4 using environmental information will be described, using FIG. 8A to FIG. 10B.

Herein, as the operational example, the environmental information list shown in FIG. 3 is used as a filtering-related environmental information list, and the environmental information list shown in FIG. 4 is used as a priority control-related environmental information list.

Firstly, an example of inputting host vehicle information and inputting other vehicle information into the dynamic distribution control means 4, and outputting other vehicle information, will be described using FIGS. 8A to 8C.

FIG. 8A is host vehicle information acquired by the dynamic distribution control means 4 from the host vehicle information distribution means 2, and FIG. 8B is a list of other vehicle information simultaneously acquired by the dynamic distribution control means 4 from the external equipment communication means 1.

Herein, it is assumed that as other vehicle information whose vehicle identifier "ID" is "1", "2", and "3", vehicle information "other vehicle information 1" of the "other vehicle 1", vehicle information "other vehicle information 2" of the "other vehicle 2", and vehicle information "other vehicle information 3" of the "other vehicle 3" is provided as an input.

In the example of FIG. 8B, positional relationships with respect to the host vehicle are such that the "other vehicle 1" is positioned approximately 100 m behind, the "other vehicle 2" is positioned approximately 200 m ahead, and the "other vehicle 3" is positioned approximately 500 m ahead.

Also, the "other vehicle 1" and the "other vehicle 3" are moving in the same direction as the host vehicle, and the "other vehicle 2" is moving in a direction opposite to that of the host vehicle.

FIG. 8C is the list of other vehicle information showing an order in which the other vehicle information is processed and distributed by the dynamic distribution control means 4.

Next, a specific example of the dynamic filtering unit 40 will be described, using FIGS. 9A to 9C.

FIGS. 9A to 9C show an aspect of classifying other vehicle information using the same kind of environmental information list as in FIG. 3.

FIG. 9A shows a process of the dynamic filtering unit 40 classifying the "other vehicle information 1" based on environmental information, FIG. 9B shows a process of the dynamic filtering unit 40 classifying the "other vehicle information 2" based on environmental information, and FIG. 9C shows a process of the dynamic filtering unit 40 classifying the "other vehicle information 3" based on environmental information.

In FIG. 9A, the ID of the "other vehicle information 1" conforms to the filtering parameter "ID={1}" of the number "1" of the same environmental information list as in FIG. 3, because of which the dynamic filtering unit 40 allows the "other vehicle information 1" to pass through based on environmental information such that the vehicle information with the ID "1" is classified using the "whitelist method".

Next, in FIG. 9B, the dynamic filtering unit 40 confirms that the ID of the "other vehicle information 2" does not conform to the number "1" of the environmental information list, and subsequently confirms that the position of the "other vehicle information 2" conforms to the filtering parameter "within 300 m" of the number "2" of the environmental information list. The dynamic filtering unit 40 allows the "other vehicle information 2" to pass through based on environmental information such that the vehicle information of a vehicle that is "within 300 m" is classified using the "distance method".

Thereafter, in the same way, as the "other vehicle information 3" conforms to the environmental information of the number "3", the dynamic filtering unit 40 eliminates the information of the "other vehicle information 3" in FIG. 9C.

Eventually, in the specific example in FIGS. 9A to 9C, the result of the operation of the dynamic filtering unit 40 is that the "other vehicle information 1" and the "other vehicle information 2" are allowed through, and the "other vehicle information 3" is eliminated.

Subsequently, a specific example of the dynamic priority control unit 41 will be described using FIGS. 10A and 10B. Herein, it is assumed that a result of the dynamic filtering unit 40 is an input, and "other vehicle information 1" and the "other vehicle information 2" are input.

Also, in order to simplify the description, there are two stages of priority level. Furthermore, as one example, the calculation method of the "distance method" is such that a priority level "2" is allotted when the relative distance from the position is within 100 m, and a priority level "1" is allotted in other cases, and the calculation method of the "risk method" is such that the priority level "2" is allotted when the directions of travel are opposed, and the priority level "1" is allotted when the directions of travel are the same.

FIGS. 10A and 10B show an aspect of calculating a priority level of other vehicle information using the same kind of environmental information list as in FIG. 4.

FIG. 10A shows a process of the dynamic priority control unit 41 calculating the priority level of the "other vehicle information 1" based on environmental information, and FIG. 10B shows a process of the dynamic priority control unit 41 calculating the priority level of the "other vehicle information 2" based on environmental information.

Next, a priority level calculation by the dynamic priority control unit 41 in a specific example will be described.

In FIG. 10A, the ID of the "other vehicle information 1" conforms to the priority control parameter "ID={1}" of the number "1" of the environmental information list, because of which the dynamic priority control unit 41 calculates the priority level of the "other vehicle information 1" using the "distance method", based on environmental information such that the priority level of vehicle information with the ID "1" is calculated using the "distance method". As a result of the calculation, the priority level "1" is allotted to the "other vehicle information 1" because the relative distance is approximately 200 m.

Also, in FIG. 10B, the ID of the "other vehicle information 2" conforms to the priority control parameter "ID={2}" of the number "2" of the environmental information list, because of which the dynamic priority control unit 41 calculates the priority level of the "other vehicle information 2" using the "risk method", based on environmental information such that the priority level of vehicle information with the ID "2" is calculated using the "risk method". As a result of the calculation, the priority level "2" is allotted to the "other vehicle information 2" because the directions of travel are opposed.

Eventually, in the specific example in FIGS. 10A and 10B, the result of the priority level calculation is that the priority level "1" is allotted to the "other vehicle information 1" and the priority level "2" is allotted to the "other vehicle information 2", and the dynamic priority control unit 41 carries out distribution of the other vehicle information in the order "other vehicle information 2", "other vehicle information 1", as shown in FIG. 8C.

In the first embodiment, the example of the multiple of lists shown in FIG. 3 and FIG. 4 is shown as the environmental information list 33, but the environmental information list 33 may be managed by being collected in one list.

According to the driving assistance device according to the first embodiment, as heretofore described, distribution of vehicle information is controlled based on environmental information, whereby distribution control in accordance with a necessity of each application can be carried out even when multiple driving assistance means need separate vehicle information, and distribution control in accordance with a dynamic necessity of each driving assistance means can be implemented even when states of multiple driving assistance means change.

Also, vehicle information received from a multiple of peripheral vehicles is classified and distributed in order of priority, based on environmental information dynamically set by a multiple of the driving assistance means 5, because of which multiple items of driving assistance can be provided to a driver of a vehicle in which the driving assistance device 100 is mounted.

Also, distribution control is dynamically changed based on environmental information dynamically set by a multiple of the driving assistance means 5, because of which driving assistance means can be added or deleted, an operation can be changed, driving assistance can be provided in accordance with a driving situation, and driving assistance an be provided in accordance with a peripheral situation.

Also, multiple filtering methods and multiple priority level calculation methods are used as appropriate based on environmental information dynamically set by a multiple of the driving assistance means 5, because of which various kinds of driving assistance can be provided simultaneously.

Furthermore, environmental information among multiple items of environmental information that indicates necessary vehicle information is applied first, because of which the driving assistance means 5 can reliably receive the necessary vehicle information.

Also, according to the driving assistance device according to the first embodiment, an order in which environmental information is applied is determined based on an environmental information method and parameter, because of which interference can be reduced with multiple items of environmental information.

Further still, according to the driving assistance device according to the first embodiment, unnecessary vehicle information is eliminated, because of which a processing load of a driving assistance device that determines a situation can be reduced, a large amount of vehicle information can be processed, and a large number of the driving assistance device can be operated.

Also, necessary vehicle information is allowed through, because of which the necessary vehicle information can be reliably distributed to the driving assistance device 5.

Also, vehicle information is distributed arranged in an order of necessity, because of which prompt driving assistance can be provided.

In the first embodiment, the driving assistance means 5 is incorporated in the driving assistance device 100, but the driving assistance means 5 may exist in an exterior of the driving assistance device 100.

Also, the driving assistance means 5 may utilize host vehicle information acquired from means other than the host vehicle information distribution means 2.

The embodiment can be modified or abbreviated as appropriate, without departing from the scope of the invention.

REFERENCE SIGNS LIST

1 External equipment communication means, 2 Host vehicle information distribution means, 3 Environmental information setting means, 4 Dynamic distribution control means, 5 Driving assistance means, 30 Environmental information receiving unit, 31 Environmental information updating unit, 32 Environmental information providing unit, 33 Environmental information list, 40 Dynamic filtering unit, 41 Dynamic priority control unit, 100 Driving assistance device, 101 Position sensor, 102 Speed sensor, 103 Gyro sensor, 104 ECU, 200 Peripheral vehicle

The invention claimed is:

1. A driving assistance device that provides driving assistance to a driver, the driving assistance device comprising:
environmental information management circuitry that manages multiple items of environmental information used for controlling distribution of multiple items of vehicle information from a peripheral vehicle received by wireless communication;
distribution control circuitry that carries out distribution control for the driving assistance of the multiple items of the vehicle information received by the wireless communication, based on the environmental information managed by the environmental information management circuitry; and
driving assistance processing circuitry that provides driving assistance to the driver based on the vehicle information distributed by the distribution control circuitry, and carries out a setting of the environmental information managed by the environmental information management circuitry, wherein
the environmental information management circuitry manages the environmental information set by the driving assistance processing circuitry, and
the environmental information includes an effect level for avoiding setting interference caused by the multiple items of the environmental information.

2. The driving assistance device according to claim 1, wherein
the distribution control circuitry includes multiple distribution control methods for controlling distribution of the vehicle information, and
the environmental information includes distribution control information that specifies the distribution control method for controlling distribution of the vehicle information, and
distribution control parameter information that specifies a setting value for applying the distribution control method.

3. The driving assistance device according to claim 2, wherein the environmental information management circuitry includes:
an environmental information list that holds multiple items of the environmental information,
environmental information receiving circuitry that receives the environmental information set by the driving assistance processing circuitry,
environmental information updating circuitry that calculates the effect level of the environmental information received by the environmental information receiving circuitry and updates the environmental information list, and
environmental information providing circuitry that provides the environmental information list updated by the environmental information updating circuitry to the distribution control circuitry.

4. The driving assistance device according to claim 3, wherein the distribution control circuitry includes:
a filter that classifies the multiple items of the vehicle information received by the wireless communication based on the environmental information list, and
priority control circuitry that calculates a priority level of the vehicle information classified in the filter based on the environmental information list, and carries out distribution control of the multiple items of the vehicle information based on the calculated priority level.

5. The driving assistance device according to claim 1, wherein
the filter includes one or more classification methods for classifying the vehicle information, selects the classification method based on the environmental information, and classifies the vehicle information based on the selected classification method.

6. The driving assistance device according to claim 4, wherein
the priority control circuitry includes one or more priority level calculation methods for calculating the priority level of the vehicle information, selects the priority level calculation method based on the environmental information, and calculates the priority level of the vehicle information based on the selected priority level calculation method.

7. The driving assistance device according to claim 3, wherein the environmental information receiving circuitry converts the environmental information set by the driving assistance processing circuitry into an information format of an interior of the environmental information management circuitry.

8. The driving assistance device according to claim 3, wherein
adding of the environmental information received by the environmental information receiving circuitry to the environmental information list, deleting of the environmental information from the environmental information list, and changing of the environmental information in the environmental information list, are included in updating of the environmental information list by the environmental information updating circuitry.

9. The driving assistance device according to claim 3, wherein
the environmental information list includes multiple items of the environmental information used in distribution control by the distribution control circuitry, and an application order of the multiple items of the environmental information in the distribution control, and
the environmental information updating circuitry calculates an effect level of the environmental information received by the environmental information receiving circuitry, and compiles an application order of the environmental information list in an order of the calculated effect level.

10. The driving assistance device according to claim 1, wherein
the environmental information management circuitry includes an environmental information list that holds multiple items of the environmental information,
environmental information receiving circuitry that receives the environmental information set by the driving assistance processing circuitry,
environmental information updating circuitry that calculates the effect level of the environmental information received by the environmental information receiving circuitry and updates the environmental information list, and
environmental information providing circuitry that provides the environmental information list updated by the environmental information updating circuitry to the distribution control circuitry.

11. The driving assistance device according to claim 10, wherein
the distribution control circuitry includes:
a filter that classifies the multiple items of the vehicle information received by the wireless communication based on the environmental information list, and
priority control circuitry that calculates a priority level of the vehicle information classified in the filter based on the environmental information list, and carries out distribution control of the multiple items of the vehicle information based on the calculated priority level.

12. The driving assistance device according to claim 11, wherein
the filter includes one or more classification methods for classifying the vehicle information, selects the classification method based on the environmental information, and classifies the vehicle information based on the selected classification method.

13. The driving assistance device according to claim 11, wherein
the priority control circuitry includes one or more priority level calculation methods for calculating the priority level of the vehicle information, selects the priority level calculation method based on the environmental information, and calculates the priority level of the vehicle information based on the selected priority level calculation method.

14. The driving assistance device according to claim 10, wherein
the environmental information receiving circuitry converts the environmental information set by the driving assistance processing circuitry into an information format of an interior of the environmental information management circuitry.

15. The driving assistance device according to claim 10, wherein
adding of the environmental information received by the environmental information receiving circuitry to the environmental information list, deleting of the environmental information from the environmental information list, and changing of the environmental information in the environmental information list, are included in updating of the environmental information list by the environmental information updating circuitry.

16. The driving assistance device according to claim 10, wherein
the environmental information list includes multiple items of the environmental information used in distribution control by the distribution control circuitry, and an application order of the multiple items of the environmental information in the distribution control, and
the environmental information updating circuitry calculates an effect level of the environmental information received by the environmental information receiving circuitry, and compiles an application order of the environmental information list in an order of the calculated effect level.

* * * * *